United States Patent [19]

Abbink et al.

[11] Patent Number: 5,428,996
[45] Date of Patent: Jul. 4, 1995

[54] HINGE ASSEMBLY FOR INTEGRATED ACCELEROMETER

[75] Inventors: Henry C. Abbink, Westlake; James W. Engel, Simi Valley; Dean H. Lodwig; Robert E. Stewart, both of Woodland Hills, all of Calif.

[73] Assignee: Litton Systems, Inc., Woodland Hills, Calif.

[21] Appl. No.: 185,466

[22] Filed: Jan. 24, 1994

Related U.S. Application Data

[63] Continuation of Ser. No. 21,211, Feb. 23, 1993, abandoned, which is a continuation-in-part of Ser. No. 633,260, Dec. 24, 1990, Pat. No. 5,191,794.

[51] Int. Cl.⁶ .............................................. G01C 1/00
[52] U.S. Cl. .................................... 73/514; 73/517 B
[58] Field of Search ................. 73/514, 517 B, 517 R

[56] References Cited

U.S. PATENT DOCUMENTS

| | | | |
|---|---|---|---|
| 4,660,418 | 4/1987 | Greenwood et al. | 73/514 |
| 4,679,434 | 7/1987 | Stewart | 73/517 B |
| 4,987,780 | 1/1991 | Abbink et al. | 73/517 B |

Primary Examiner—Richard E. Chilcot, Jr.
Assistant Examiner—R. Biegel
Attorney, Agent, or Firm—Elliott N. Kramsky

[57] ABSTRACT

An integrated accelerometer includes hinges of silicon composition for securing the strut legs of a pendulous mass to the accelerometer body. Both the body of the accelerometer and the pendulous mass are of metal-coated compositions. Metallized pads are provided on selected surfaces of the hinges for forming eutectic bonds with the body and struts of the pendulous mass of the accelerometer. A heavily-doped continuous region adjacent the surface of the hinge connects the eutectic bonds through a flexure region of reduced thickness to complete necessary device circuitry.

14 Claims, 4 Drawing Sheets

HINGE ASSEMBLY FOR INTEGRATED ACCELEROMETER

BACKGROUND

Related Application

The present application is a continuation of and claims priority under 35 U.S.C. 120 from patent application 08/021,211 filed Feb. 23, 1993, now abandoned. The latter application is a continuation-in-part of U.S. patent application Ser. No. 633,260 of Henry C. Abbink, Daryl K. Sakaida and Stanley F. Wyse entitled "Integrated Accelerometer with Durable Sub-Assemblies" which was filed on Dec. 24, 1990, now U.S. Pat. No. 5,191,794.

FIELD OF THE INVENTION

The present invention relates to integrated accelerometers. More particularly, this invention pertains to an integrated accelerometer that includes improved hinge and hardstop assemblies.

DESCRIPTION OF THE PRIOR ART

Accelerometers of the hinged, pendulous mass type have substantially replaced floated accelerometers in modern strapdown inertial navigation systems. Such hinged accelerometers offer smaller size, lighter weight and simplified construction. Functionally, a common type of single axis accelerometer comprises a pendulous mass that is suspended within a housing by flexure-type hinges. When subjected to acceleration, the mass pivots or rotates about the hinge axis to thereby shutter the output of a light-emitting diode (LED) that is conventionally located adjacent to the non-pivotal or "free" end of the mass. This is detected by a photodetector circuit. The circuit produces an output signal that is proportional to the sensed acceleration. Such signal is amplified and the resultant current is applied to a torquer coil that is mounted to the pendulous mass. The coil reacts with a permanent magnet that is affixed to the housing to return the mass to a substantially neutral (null) position. The torquing current provides a measure of the input acceleration.

The hinges that suspend the proofmass are essential elements of the accelerometer. These elements determine two key accelerometer performance factors, shock capability and long term bias stability. The cost of the accelerometer is, of course, closely related to the costs of the various sub-assemblies that comprise the accelerometer and by the extent to which assembly labor and yield loss can be eliminated through fixturing.

Various hinge assemblies and fabrication methods have been employed in the past. Hinges formed of "ELGILOY" are utilized in the accelerometers disclosed in U.S. Pat. No. 4,987,780 of Abbink et al. entitled "Integrated Accelerometer Assembly" and in pending U.S. patent application 633,260 of Abbink et al. entitled "Integrated Accelerometer With Durable Sub-Assemblies". Each of the preceding references is property of the assignee herein.

The A4 "family" of integrated accelerometers manufactured by Litton Systems, Inc. which includes the Mod IVD, Mod VIIBR and Mod 7C variations employs many teachings of the above-identified patents. The hinges employed in those devices are cut from sheets of 0.003 to 0.005 inch thick ELGILOY. The thin flexure portion is first formed by precision grinding and the hinge is then tuned. Tuning consists of an electro-polishing operation whose end point is reached when the appropriate natural frequency of the unmounted hinge path is achieved. The hinges are bonded in place with EPOXY. In the Mod IVD and VIIBR, electrical contact is achieved by tinning the hinges with active flux, then cleaning and soldering small wires to the hinge. In the Mod 7C ceramic accelerometer, electrical contact to the hinge is achieved by wire bonding to gold pads that are sputtered onto the ELGILOY.

Hardstop assemblies are required in conjunction with the above-described hinge assemblies to limit translational flexion of the hinges so that the elastic modulus of the hinge material is not exceeded. Various hardstop systems have been employed in the prior art. In one type (employed on the Mod IVD and Mod VIIBR), miniature pointed screws, requiring adjustment by testing on the completed accelerometer, are utilized. In the Mod 7C, the hardstop gap is fixed in the fabrication of the hinge hardstop assembly by laser welding to the hinge frame.

Another type of prior art arrangement employs a photoetched quartz hinge without a hardstop. The hinge is metallized to act as a conductor for the torquer coil. A complicated hinge cross section is required to locate the conductor on the neutral bending axis.

The above approaches are subject to numerous shortcomings. The hinge fabrication process for forming ELGILOY assemblies is both complicated and costly, requiring wire electro-discharge machining of the hinge blank, precision grinding and individual electropolishing to a specific frequency to match the loop closure requirements of the accelerometer. Such prior art hinges are also subject to shock limitations that can result in field failures, system test return failures and preclude some uses of the accelerometers.

Another disadvantage associated with use of hinges of ELGILOY fabrication relates to the required use of protective hardstops. As already mentioned, devices of both the miniature screw and fixed (adjustable by microbending type have been employed in the prior art. When employed in conjunction with an ELGILOY (or other metallic) composition hinge, the hardstop gap must be approximately 0.0001 inch to be effective. Each approach involves fabrication and assembly problems which make the creation and maintenance of such a gap costly and difficult. Screw-type hardstops tend to change gap size with temperature, causing potential bias shift during turn-on and reduced shock capability at certain temperatures.

The soldered electrical contacts employed with ELGILOY hinges, as mentioned previously, require labor-intensive operations by highly skilled employees. While wire bonding represents an improvement, the placement of gold pads on the hinges is costly both in terms of labor and material.

In the quartz hinge approach, the lack of conductivity of the hinge material necessitates a complicated process for grooving the hinges at the precise neutral bending axes prior to metallization. Additionally, since deposited metal films are subject to stressing, any error in placing the conductor on the neutral axis can produce bias shift or trends as the conductor relaxes over time. The very low temperature coefficient of quartz does not, of course, match that of the good conductor metals. Accordingly, at some temperatures, the metal must be stressed and storage at such temperature can lead to bias shifts.

SUMMARY OF THE INVENTION

The foregoing and other shortcomings of the prior art are addressed by the present invention that provides an integrated accelerometer. Such accelerometer includes a planar support base that has an internal aperture. A pendulous mass includes a pair of strut legs. A pair of hinges is provided for flexibly engaging the free ends of the arms to the support base. Each of the hinges is of silicon composition.

The preceding and other features and advantages of the invention will become further apparent from the detailed description that follows. Such description is accompanied by a set of drawing figures. Numerals of the text, corresponding to those of the drawing figures, point to the various features of the invention. Like numerals refer to like features throughout both the drawing figures and the written text.

DETAILED DESCRIPTION

Figure 1:
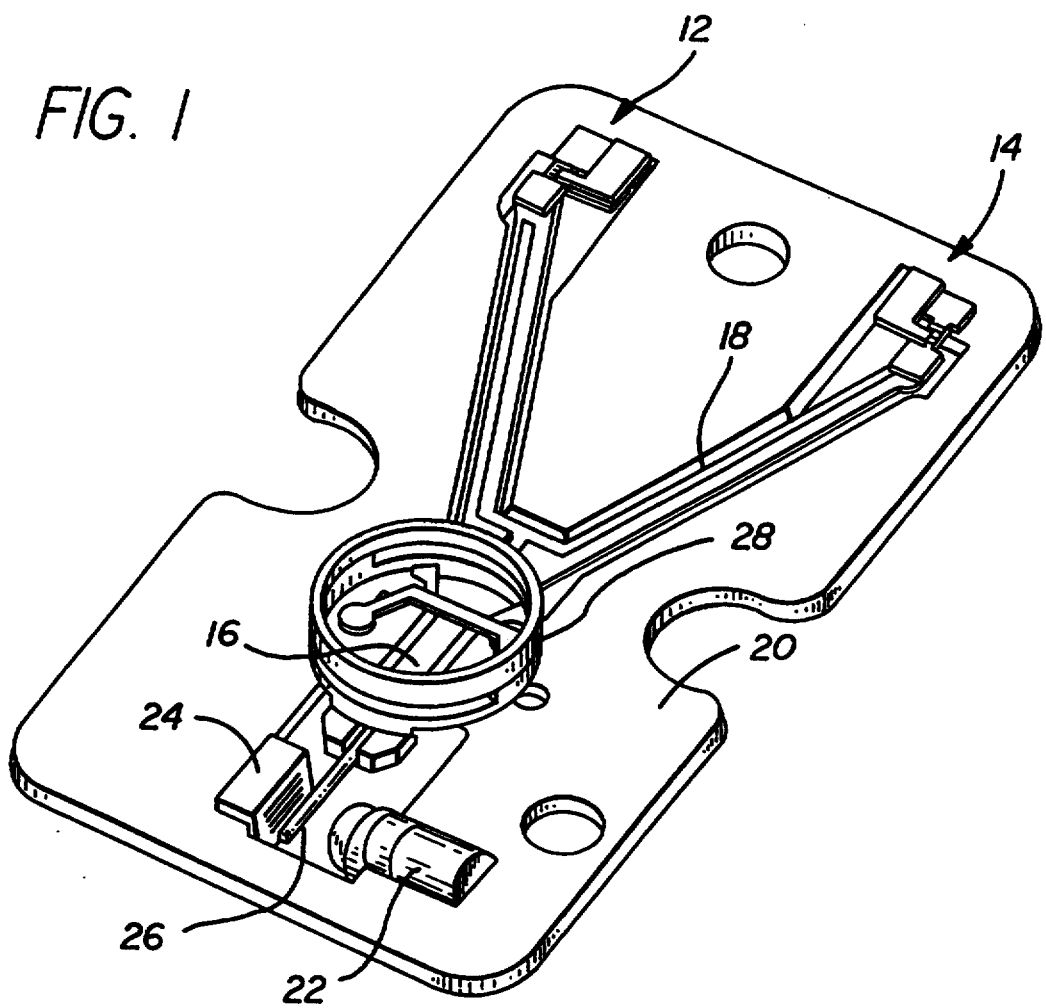
FIG. 1 is a perspective view of an accelerometer incorporating hinge elements in accordance with the invention.

FIG. 1 is a perspective view of an integrated accelerometer 10 incorporating hinge assemblies 12 and 14 in accordance with the invention. The accelerometer 10 comprises a compact, simplified and relatively easy-to-manufacture device that is suitable for batch processing. Further, as will be discussed infra, the fabrication of the essential hinge and optional hardstop assemblies of the accelerometer 10 is also suited to the well known batch processing techniques available to silicon wafer-based devices. This is to be contrasted with the complex and accordingly difficult-to-manufacture assemblages of the prior art that include block-like metallic support frames which require numerous discrete fasteners that demand hand assembly. (Note: although the element 10 is termed an "accelerometer" throughout this application it will be understood by those skilled in the art that the disclosed device does not constitute a complete accelerometer which would, of course, also include a magnet and a magnetic circuit in addition to the component elements enumerated and disclosed herein.)

Generally, the accelerometer 10 comprises a pendulous mass 16 that includes a pair of legs in the form of a two-legged strut 16 mounted within an accommodating aperture 18 of an accelerometer base member 20. The base 20 is of ceramic composition (with a metallic coating, discussed below) as is the pendulous mass 16 with the major surfaces of each metallized for conducting the various electrical signals required to control the attitude of the mass 16 of the associated closed loop force rebalance system. The metallized coating of the ceramic material preferably comprises a 200 Angstrom thick layer of titanium and an overlying or top layer of gold having a thickness of 12,000 Angstroms. It is essential for accuracy that the null position of the pendulous mass 16 be as close to coplanarity with the base member 20 as possible to avoid bias errors. Such errors may arise during either the manufacture or subsequent use of the device. In the present invention, it will be seen that this error source is substantially avoided and overcome by the choice of hinge (and hardstop) materials coupled with the manner of attachment of the hinge assembly to the base member 20 and to the struts of the pendulous mass 16.

Returning generally to the accelerometer as shown in FIG. 1, a light-emitting diode (LED) 22 is accommodated within the base 20. A shadow arm 26, fixed to the end of the pendulous mass 16, extends into section 28 of the aperture 18 in the base 20. The hinge assemblies 12 and 14 maintain the attitude of the pendulous mass 16 relative to the base member 20 absent any external acceleration-force so that the shadow arm 26 will interrupt transmission of emitted light from the LED 22 to the photodetector 24 when the device is at rest. The imposition of an acceleration force along the sensitive axis of the accelerometer 10 will deflect the free end of the pendulous mass 16 relative to the base 20 to cause a corresponding displacement of the shadow arm 26. The amount of deflection caused by a given acceleration force is a function of the stiffness of the hinges 12 and 14 in an open loop arrangement. In a closed loop accelerometer, the rotational deflection is determined by the stiffness of the electronics loop for any reasonable input level. In designing such a device, the limit stops of the device are set to permit a predetermined degree of rotation of the arm 26, taking into consideration the spring rate of the hinges and a corresponding input acceleration G level.

Light proportional in amount to the physical degree of displacement of the shadow arm 26 will be detected at the photodetector 24 and a d.c. electrical signal of corresponding value thereby generated. Such signal is transmitted to a conventional feedback control system (not shown) in which a corrective current is generated that is delivered to the torquer coil 28 of the accelerometer to drive the pendulous mass 16 magnetically in a direction opposite to the displacement caused by the acceleration force. The amount of current required to return the shadow arm 26 to neutral provides a measure of the acceleration force.

The hinge assemblies 12 and 14 that attach the struts of the pendulous mass 16 to the base member 20 perform two critical functions. First, they provide a flexible and resilient interface between the struts of the mass 16 and the base 20. Optimally, this interface will repeatably return the pendulous mass 16 to a null position with respect to the base 20, without positional bias, in the absence of an acceleration force. That is, they must not only flex but must be of sufficient compliance to assure that, over time, temperature and use, the pendulous mass 16, in the absence of an acceleration force along the sensitive axis of the device, will be reliably returned to a null position of coplanarity with the accelerometer base member 20.

Additionally, the hinges 12 and 14, by nature of their physical deployments, must play a role in completing the electrical circuit for forcing the pendulous mass 16 to a null position when the device is subjected to an acceleration force. As mentioned, prior art devices have been commonly formed of ELGILOY or like spring metal. This well-known watch spring material possesses a very high elastic limit (approximately 270,000 p.s.i.) and demonstrates good mechanical hysteresis allowing it to absorb a large load without substantial deformation. The tensile strength of this material is approximately 300,000 p.s.i. and the material is known to rupture at about 340,000 p.s.i.

While the above-stated properties of ELGILOY are impressive, the so-called microyield stress (2 p.p.m. strain) or microelastic limit of such material is 27,000 p.s.i. That is, when subjected to that degree of stress, very small deformations (measured in parts per million) will take place. Such barely-observable strains will produce a micro-bias shift of the null position of the pendulous mass 16 well before hinge failure. In the present invention, numerous significant advantages follow from the inventors' successful fabrication and incorporation of hinges of a crystalline material, silicon, into the accelerometer 10.

Figure 2A:
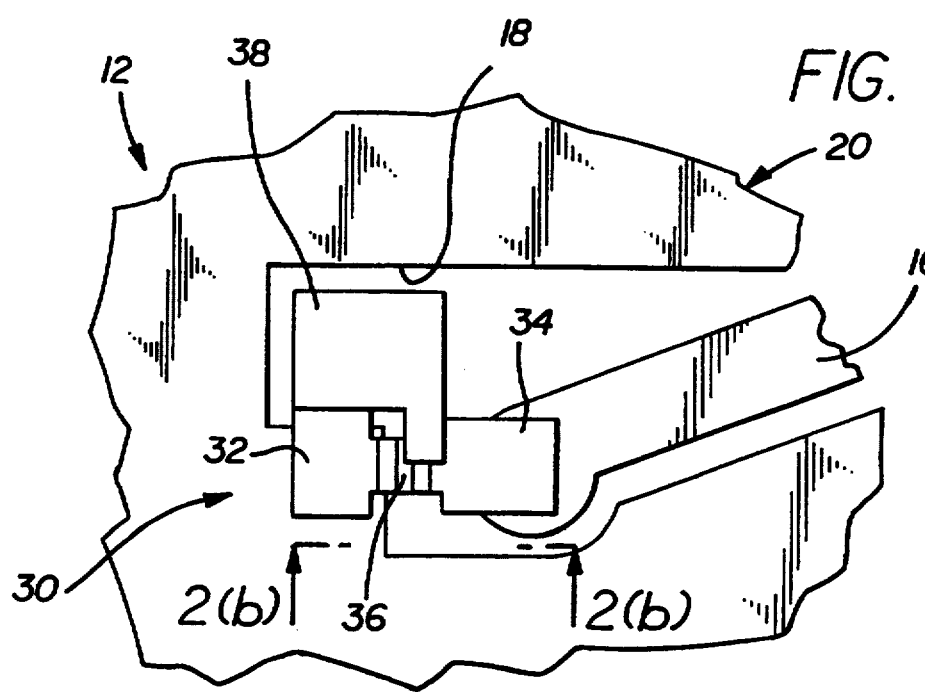
FIGS. 2(a) and 2(b) are enlarged plan and elevation views of a portion of the accelerometer of FIG. 1 for illustrating the detailed structure of a hinge assembly in accordance with the invention.
Figure 2B:
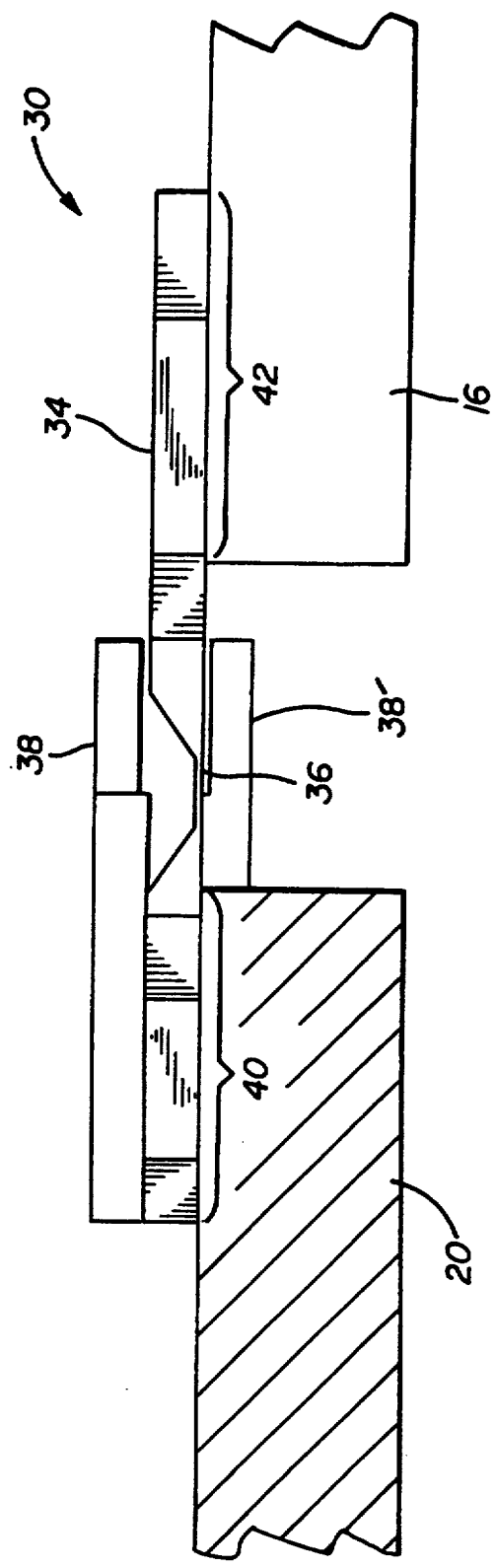

FIGS. 2(a) and 2(b) are enlarged plan and elevation views, respectively, of portions of the accelerometer of FIG. 1 for illustrating the detailed structure of a hinge assembly in accordance with the present invention. As can be seen in FIG. 2(a), the representative hinge assembly 12 includes a hinge element 30 having opposed paddle-like areas 32 and 34 for contacting the base 20 and a strut of the pendulous mass 16 respectively. As will be discussed in greater detailed below, each of the paddle-like members is fixed to the corresponding accelerometer element by a eutectic bond that enhances the planarity of the device, reducing the possibility of harmful biasing the pendulous mass 16.

The paddle-like areas 32, 34 are joined by an intermediate flexure area 36. It can be seen in FIG. 2(b) that the thickness of the flexure area 36 is substantially less than that of the rest of the hinge element 30. This permits the hinge to function as a flexible element that allows displacement of the pendulous mass 16 from its null position when acceleration is sensed along the sensitive axis. A hardstop 38 is fixed to the top of the hinge 30 in the region of the area 32. As can be seen in FIG. 2(b), a matching hardstop 38' is fixed to the bottom of the same paddle-like area. As discussed below, the hardstops 38, 38' may be dispensed with in certain applications as a consequence of the silicon composition of the hinge element 30.

As can be seen most clearly in FIG. 2(a), both the hinge 30 and the hardstop 38 are peripherally defined by a series of orthogonally-arranged straight edges that reflect the crystalline nature of the constituent silicon material. The straight edges result from the conventional batch processing of the silicon wafer "building blocks" employed for fabricating the elements of the hinge assembly 12, such processing including the preferential etching of silicon wafers along crystal planes. The designs or shapes are squared off, reflecting the fact that the rate of anisotropic etching is substantially slowed, and, therefore, most easily controlled, along orthogonal, close-packed crystallographic directions or planes of the silicon crystal.

The inventors have found that crystalline silicon offers significant advantages, in both fabrication and use, over hinges (and hardstops) formed of spring metal. While the elastic limits of silicon and ELGILOY, for example, are comparable, the crystalline silicon, due to its brittleness, is substantially immune from the minute deformations experienced by ELGILOY above 27,000 p.s.i. As mentioned earlier, these microdeformations can accumulate over time in metal hinges and thereby lead to undesirable bias shifts. Silicon has an elastic limit of 350,000 p.s.i. and, as it is a single crystal material without dislocations and other defects which can flow, it will not creep or microdeform as metals do. The microyield stress of silicon in the ordinary temperature range of accelerometer operation and storage is close to the elastic limit. As such, a hinge of silicon composition will, of course, break when its elastic limit is reached, but one can discount the presence of bias effects prior to that as essentially no microelastic deformation will occur. This leads to increased shock capability, better turn-on to turn-on repeatability and better long term bias stability. Additionally, since the Young's modulus of silicon is approximately half that of ELGILOY and it possesses a higher elastic limit (350,000 p.s.i. as opposed to 270,000 p.s.i.), a silicon hinge can translate over 0.001 inch in the input axis direction before reaching its elastic limit. Accordingly, for a silicon hinge having the same length and width of flexure area section 36, one can double the thickness of the critical area while obtaining the same stiffness as a corresponding ELGILOY hinge. This reduces the required fabrication tolerances and permits more precise control of the hinge spring rate. Due to the higher microelastic limit of silicon, for a given spring rate a hinge will possess increased shock capability. In applications not requiring exceptional shock performance, the hard stops may be unnecessary and eliminated from the accelerometer design. Further, such a material quality allows one to relax (i.e. widen) the gap requirements in applications that require additional shock capability and, hence, the use of hardstops.

The side elevation view of FIG. 2(b) illustrates the very planar configuration that is achieved by the present invention. The degree of planarity is inversely proportional to the bias of an accelerometer. In the prior art, the ELGILOY hinge that provides flexible connection between the accelerometer 20 and the pendulous mass 16 is bonded to those bodies by means of an appropriate adhesive such as EPOXY. This can compromise the planarity of the device and consequently lead to bias errors. The EPOXY layer may be applied unevenly or the clamping of the hinge to the bodies by means of a fixture may produce unevenness that results in the setting of an angular orientation of the pendulous mass 16 relative to the body 20. Alternatively, even if initially fixed in a planar attitude and without the presence of a bias angle, the EPOXY adhesive may experience bias shift and hysteresis as a result of temperature cycling as the adhesive is an organic material that can flow under stress. In contrast, the hinge 30 is preferably fixed to the accelerometer body and to the end of the strut of the pendulous mass 16 by means of a eutectic bond in which an intermetallic compound is formed at the interfaces 40 and 42.

Figure 3A:
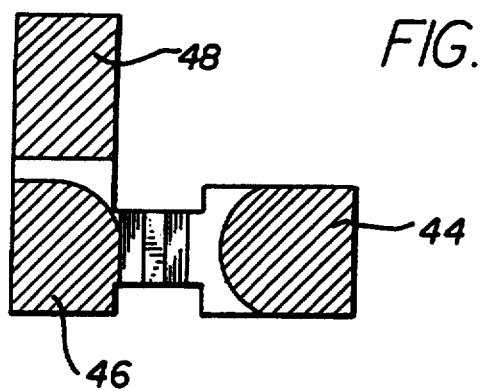
FIGS. 3(a), 3(b) and 3(c) are a plan view and side sectional views for illustrating the bonding pad assemblies and the eutectic bonding process for affixing a hinge to the accelerometer.
Figure 3B:
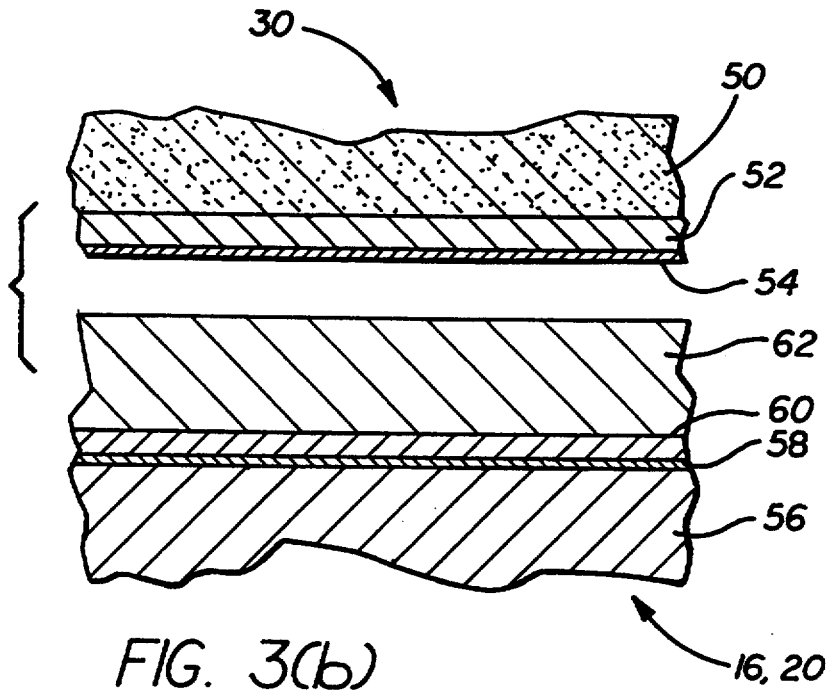

FIG. 3(a) is a plan view of the hinge 30 illustrating the arrangement of the various bonding pads 44, 46 and 48 for forming eutectic bonds between the hinge 30 and the pendulous mass 16, the accelerometer body 20 and the hardstop 38 respectively while FIG. 3(b) is a cross-sectional exploded view of the outer surfaces of a hinge pad and the ceramic body 20 (or pendulous mass 16) for forming a eutectic bond. As already mentioned, such bonds improve the flatness of the assembled accelerometer, thereby reducing bias errors. Furthermore, the bonds act in conjunction with the doping profile of the silicon elements (discussed below) to provide the necessary electrical paths for completing the required circuitry through the hinge.

Figure 3C:
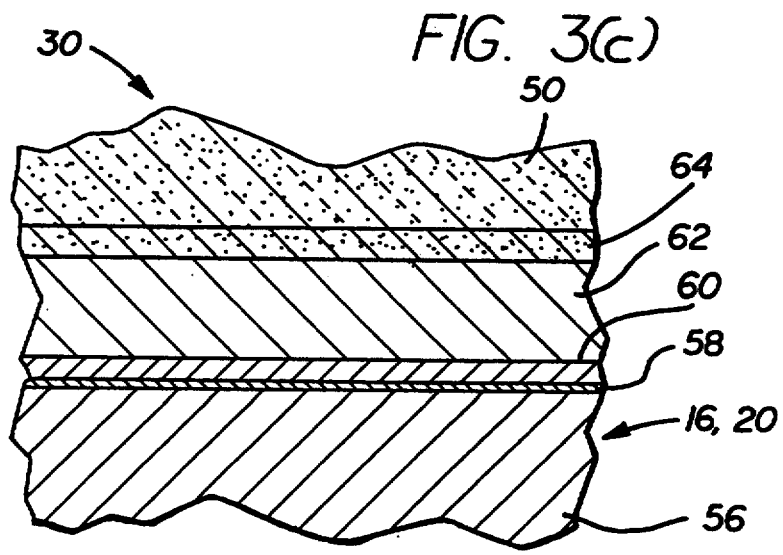

FIG. 3(b) is a cross-sectional view of the mating surfaces of a hinge 30 and the accelerometer base 20 (alternatively, a strut of the pendulous mass 16) for illustrating the component metallic layers prior to formation of a eutectic bond whereas FIG. 3(c) is a corresponding view after formation of the intermetallic layer by the preferred eutectic bonding process.

Referring back to FIG. 3(b), the hinge 30 comprises a single crystal silicon wafer 50. The silicon wafer 50 is coated with a sputter deposited tin layer 52 having a thickness of approximately 2,000 Angstroms in the areas for forming the contacting pads 44, 46 and 48. The tin layer 52 is protected from oxidation by a 500 Angstrom thick gold layer 54. Thus, the pads comprise patterned regions of tin 52 with an overlying protective gold layer 54 placed selectively over a base silicon wafer 50.

The accelerometer body 20 comprises a ceramic core 56 coated with various metallizations. A thin (about 200 Angstrom) titanium layer 58 provides adhesion between the ceramic core material 56 and an overlying gold layer 62 of approximately 12,000 Angstroms thickness which is deposited by sputtering and therefore very adherent.

Since the hinge-hardstop assembly is to be tooled into place, a process that does not require extremely high temperatures is desirable. While a tin-gold eutectic process is presently preferred, other eutectic materials, including solder, may be employed. Tin will melt at 232 degrees Centigrade to form a eutectic with gold at about 20 percent tin with a melting point of about 300 degrees Centigrade. An attachment fixture is employed to force the hinge pads against the metallized layer. Only about 1000 Angstroms of tin/gold will become molten so that the initial parallelism between the hinge pad and the ceramic surface of the accelerometer body will be maintained.

In FIG. 3(c) it is seen that through the above-described eutectic bonding process, an intermetallic layer 64 that comprises a mixture of gold and tin is formed between the hinge 30 and the base 20 (or, alternatively, the pendulous mass 16). By utilizing eutectic bonding the accelerometer base and the pendulous mass both are connected mechanically and conductively with the hinge assembly. While such a bonding process is presently greatly preferred, other known processes may be employed to affix the silicon hinge assembly to the accelerometer including thermocompression/ultrasonic bonding, epoxy and wire bonding and resistance welding.

In addition to assuring that parallelism is maintained in affixing the hinge assembly to the accelerometer, it is essential that the process for attaching the hinge assembly to the accelerometer achieve co-planarity so that the precision gap achieved at the hinge/hardstop assembly is maintained at the accelerometer level. This may be accomplished in a number of ways. For example, a eutectic attachment process may be employed in conjunction with interferometer observation and adjustment. In such a process, hinge coplanarity is observed during bonding with use being made of fixturing for fine adjustment of hinge position. Alternatively, a eutectic attachment may involve floating the hinge on the molten eutectic material for coplanarity and keeping the hinge in a-free state during cooling. Finally, clamped attachment may employ pressure to obtain very thin bonds while utilizing the flatness of the hinge assembly and wafer to attain coplanarity.

Figure 4:
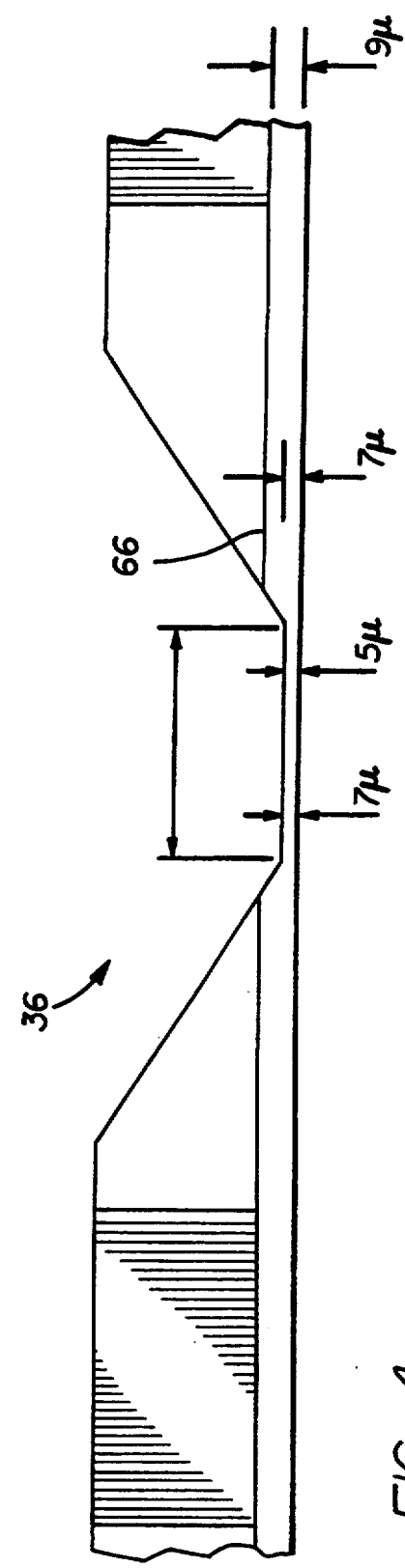
FIG. 4 is a cross-sectional view of a silicon hinge for illustrating the doping profile thereof.

FIG. 4 is a cross-sectional view of the central portion of a hinge for illustrating the dopant distribution therein. As mentioned earlier, the hinge 30 includes a central flexure region 36 of greatly diminished thickness that permits the necessary deflection of the pendulous mass 16 under the influence of an acceleration force.

The hinge can be fabricated, for example, from a four inch diameter silicon wafer so that approximately 75 hinges and frames are formed from a single wafer. The preferred thickness of such a wafer is approximately 0.005 inch although this value can vary according to application. A carrier wafer is employed during the fabrication process to facilitate micromachining of the hinge and frame by anisotropic etching. The hinge wafer is preferably n type due to the greater mobility of electrons which permits a higher degree of conductivity, for the same doping level, than p-type silicon.

In the prior art, the necessary electrical signal transmission through the hinge (i.e. between the pendulous mass 16 and the accelerometer body 20) was accomplished by various means, including the soldering of wires and the use of wire bonds, as described above. Further, prior attempts to design and fabricate silicon-based hinges have been hampered by the relatively low conductivity of the material. In the present invention, the necessary conductive signal path is achieved and cumbersome prior art processes such as wire bonding are rendered unnecessary by employing doping processes that are well known in the semiconductor art. In the invention, a conductive path is provided between the pendulous mass 16 and the body member 20 through the flexure portion 36 which comprises the combination of the intermetallic eutectic bonds (discussed above) formed at the interfaces of the struts of the pendulous mass 16 and the body 20 of the accelerometer with the hinge 30 with a low resistance path through the flexure portion 36 formed adjacent the surface of the hinge that connects the bonds. This conductive path bridging the eutectic bonds is achieved by the use of conventional selective silicon doping techniques. Various tasks and processes for fabrication of hinge assemblies that realize the advantages of silicon technology and, in particular, the design herein are discussed below. It should be kept in mind that the improved characteristics of devices in accordance with the invention rely upon conventional silicon and related processing methods that offer many advantages when applied to the formation and attachment of the inventors' hinge assemblies. Some of such advantages, such as low bias and bias stability, have been mentioned in passing. Others, principally the economically-significant adaptability of batch processing techniques to the fabrication of hinge assemblies will become further apparent below.

Batch Processing: Hinge and Hinge Frame Fabrication

In a preferred embodiment of the invention, the hinges may be fabricated from four inch diameter silicon wafers with a batch yield of seventy-five (75) hinges and their frames fitting on the wafer. The preferred thickness of the wafer is approximately 0.005 inch. To obtain the desired yield and facilitate micromachining of the hinge and frame by anisotropic etching, the wafer is bonded to a carrier wafer that is precision ground flat and parallel to within 0.25 microns. (The thickness of the carrier wafer is not critical but 0.012 inch is convenient.)

The carrier wafer is oxidized to a thickness of about one micron. The hinge wafer is n-type, preferably as heavily doped with arsenic, or other applicable dopants, as possible. The surfaces of this wafer are precision ground flat and parallel to within 0.25 micron. Arsenic atoms are diffused into the hinge wafer at a doping level of $5 \times 10^{20}$ atoms per cubic centimeter to a depth of about nine microns. The hinge flexure will eventually lie in this diffused layer.

The concentration profile in the outer seven microns should be as constant as possible to avoid a fixed bend in the hinge that would increase the fixed bias of the accelerometer. It may be necessary to lower the concentration of dopant on the source side through etch and oxidation steps to obtain a sufficiently constant concentration profile. As mentioned earlier, in the event that hinge bending due to doping gradient should prove to be a significant problem, boron doping may be substituted for arsenic. (The resistivity will be somewhat higher but the atomic size match is better and it would be easier to achieve a constant doping level.)

The wafer is oxidized to about one micron to remove the surface layer which may be damaged due to precision grinding. The oxide will eventually be etched away. The wafer is then bonded to the carrier wafer by placing the diffused side of the wafer against the carrier wafer and heating the assembly to 1100 degrees Centigrade. Once attached to the carrier wafer, the wafer containing the diffusion is precision ground to 0.005 inch.

Figure 5:
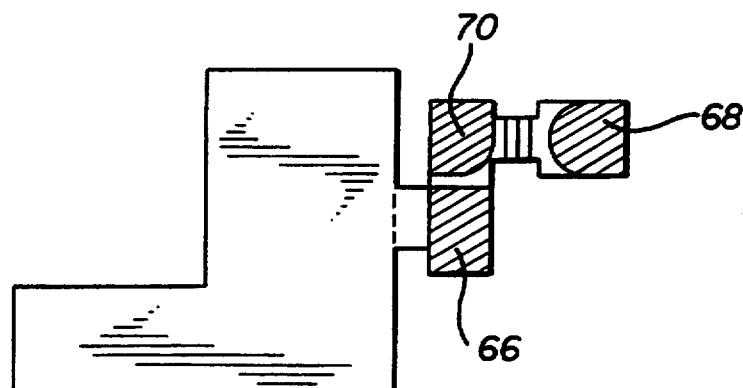
FIG. 5 is a top plan view of a portion of a hinge wafer including multiple hinges.

The hinge frame and the flexing portion 36 are etched by standard anisotropic methods. A representative hinge is of a length of about 0.006 inch and width about 0.012 inch with a thickness of about 0.0002 inch (5 microns). FIG. 5 is a top plan view of a portion of a hinge wafer including multiple hinges. As can be seen, pads for contacting hardstops 66, struts 68 and the accelerometer body 70 have been sputter deposited upon predetermined portions of the hinges.

Batch Processing: Fabrication of Hardstop

Figure 6:
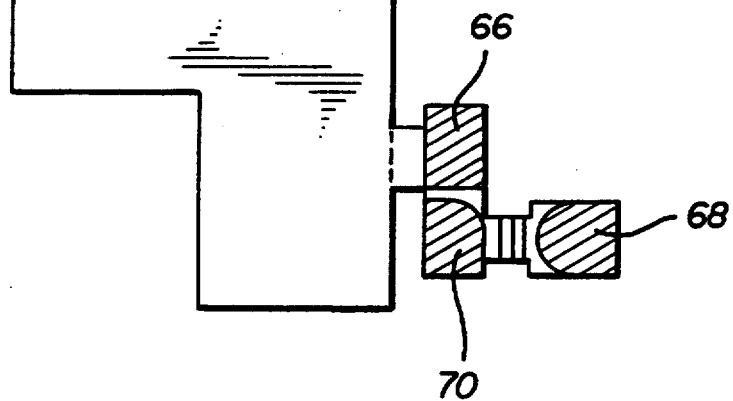
FIG. 6 is a top plan view of a portion of a hardstop wafer with multiple hardstops.
Figure 6:
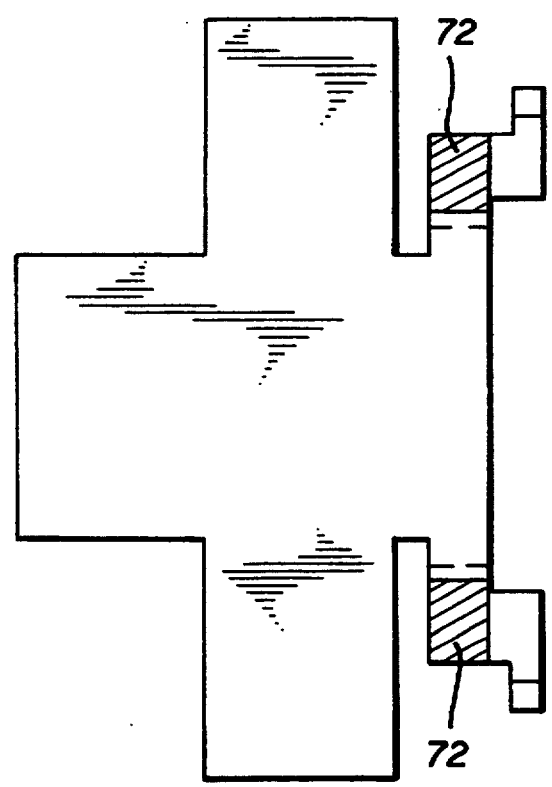

Hardstops are fabricated from wafers of the same size and type as the hinge. Such wafers are precision ground, oxidized and bonded to a carrier wafer and then precision ground to a thickness of about 0.005 inch. The hardstop pattern and gap notches are anisotropically etched. FIG. 6 is a top plan view of a portion of a hardstop wafer with multiple hardstops. It can be seen that bonding pads 72 are sputter deposited on the hardstops for forming eutectic bonds with the accelerometer hinges. Such bonding of the hardstop to the hinges is discusssed, infra.

Batch Processing: Attachment of Hardstop to Hinge Frame

A hinge wafer and two hardstop wafers are separated from their carrier wafer by etching in buffered hydrofluoric acid to dissolve the oxide bonding them to their carrier wafers. The hardstops may be attached to their hinges as wafers or as individual parts. Preferably, the hardstop wafers are bonded to the hinge wafers and then the unwanted portions of the hardstop wafers are then separated. A number of conventional techniques may be applied to bond the hardstops to hinges. Each of such techniques may be applied to wafers or individual parts. Such techniques includes fusion bonding, anodic bonding employing borosilicate glass, eutectic bonding as described above with reference to fixation of the hinge to the accelerometer body, thermal migration, thermal compression/ultrasonic bonding and resistance welding.

Batch Processing: Electrical Contact to the Hinge

Electrical contact to the hinge may be achieved by sputter metallization of the accelerometer bonding pads of the hinges. As this is the side of the heavily doped diffusion layer, a low resistance contact is readily achieved as long as all oxide is removed before the metal is put down. This can be accomplished by sputter cleaning. The metallization must be done through a shadow mask to assure that no metal is deposited on the flexure portion 36 of the hinge, thereby eliminating a possible source of bias temperature sensitivity or bias hysteresis effects. The metallization may be titanium followed by gold or a three layer chromium, nickel gold. The material selection will depend upon the hinge attachment processes employed.

Batch Processing: Separation of Hardstop Wafer From Hinge Wafer and Hinge-Hardstop Assembly From Hinge Wafer After the hardstops have been bonded to the hinges, the supporting structure of the hardstop wafer must be separated from the hinge wafer. This may be done before or after the metallizations are complete. It may be advantageous to do this after metallization since the hardstop frames will add stability to the assembly. A number of conventional methods including anisotropic etching, cutting with a diamond saw, partial scribing and breaking, and laser separation or laser etching may be employed at this stage. It should be noted that each of such separation methods may be enhanced by the placement of a notch in the hardstop separation region.

Batch Processing: Separation of Hinge From Supporting Structure After Bonding to the Accelerometer Wafer Again, conventional methods may be employed at this stage including partial scribing and breaking, laser separation or laser etching and cutting with a diamond saw. Each of such methods can be enhanced by a slot in the separation region.

Thus it is seen that the present invention provides an improved integrated accelerometer arrangement that incorporates hinge assemblies based upon silicon wafer technology. By employing the teachings of this invention, one can obtain numerous advantages both in terms of accuracy and performance reliability. By utilizing silicon as opposed to a conventional spring metal such as ELGILOY, one may improve the shock capability and long term bias stability of the accelerometer while realizing economy of manufacture as a consequence of the amenability of the hinge assembly to conventional silicon processing techniques.

While this invention has been described with regard to its presently preferred embodiment, it is not limited thereto. Rather, this invention is limited only insofar as defined by the following set of patent claims and includes within its scope all equivalents thereof.

What is claimed is:

1. An integrated accelerometer comprising, in combination:
   a) a planar support base of metal-coated ceramic composition having an internal aperture;
   b) a pendulous mass of metal-coated ceramic composition including a pair of strut legs;
   c) a pair of hinges for flexibly engaging the free ends of said strut legs to said support base; and d) each of said hinges being of single crystal silicon composition and including metallic pads for bonding to said base and to said pendulous mass.

2. An accelerometer as defined in claim 1 wherein eutectic bonds fix said hinge to said base and to said pendulous mass.

3. An accelerometer as defined in claim 2 wherein said hinge further includes:
   a) a first etched paddle-like region for contacting said pendulous base;
   b) a second etched paddle-like region for contacting said pendulous mass; and
   c) an etched flexure region of reduced thickness for connecting said first paddle-like region to said second paddle-like region.

4. An accelerometer as defined in claim 3 wherein said metallic pads are located on said first and second paddle-like regions.

5. An accelerometer as defined in claim 4 wherein said flexure region further comprises:
   a) a first tapered region for joining said first paddle-like region to a region of a predetermined reduced thickness;
   b) a second tapered region for joining said second paddle-like region to said region of reduced thickness; and
   c) a region of low resistivity located within said hinge for providing electrical connection between said paddle-like regions through said region of reduced thickness.

6. An accelerometer as defined in claim 5 wherein said metallic pads comprise tin.

7. An accelerometer as defined in claim 6 wherein said eutectic bonds comprise tin and gold.

8. An accelerometer as defined in claim 5 further characterized in that:
   a) said silicon is n-type; and
   b) said region of low resistivity is doped with arsenic atoms.

9. An accelerometer as defined in claim 5 further characterized in that:
   a) said silicon is n-type; and
   b) said region of low resistivity is doped with boron atoms.

10. An accelerometer as defined in claim 5 further characterized in that:
    a) a hardstop is fixed to each of said hinges; and
    b) each of said hardstops is of silicon composition.

11. An accelleromter as defined in claim 10 wherein each of said hardstops is of single crystal silicon.

12. An accelerometer as defined in claim 11 wherein each of said hardstops includes metal pads for bonding to a hinge.

13. An accelerometer as defined in claim 12 wherein said hardstops are fixed to said hinges by means of eutectic bonds.

14. An accelerometer as defined in claim 13 wherein said hardstops are bonded to said first paddle-like regions of said hinges.

* * * * *